United States Patent [19]

Ross

[11] Patent Number: 4,903,276
[45] Date of Patent: Feb. 20, 1990

[54] POWER SUPPLY FOR RADIO-FREQUENCY EXCITED GAS LASER

[75] Inventor: Iain E. Ross, Fife, Scotland

[73] Assignee: Ferranti, plc, Cheshire, England

[21] Appl. No.: 187,981

[22] Filed: Apr. 29, 1988

[30] Foreign Application Priority Data

May 6, 1987 [GB] United Kingdom ............ 8710644

[51] Int. Cl.⁴ .............................................. H01S 3/097
[52] U.S. Cl. ........................................ 372/82; 372/38; 372/81
[58] Field of Search ....................... 372/38, 81, 82, 33, 372/29

[56] References Cited

U.S. PATENT DOCUMENTS 4,539,685  9/1985  Hart et al. ............................... 372/82

Primary Examiner—William L. Sikes
Assistant Examiner—B. R. R. Holloway
Attorney, Agent, or Firm—Kerkam, Stowell, Kondracki & Clarke

[57] ABSTRACT

The power supply includes an oscillator (20) which generates a radio-frequency signal amplified by an amplifier (21). The amplified signal is applied to a laser (22) to initiate and maintain a discharge in the laser gaseous active medium. Power control means (24) are provided operable after initiation of the discharge to adjust the power applied to the laser to the value required to operate the laser at maximum efficiency. Automatic gain control means (25) may be provided, responding to the output from a power meter (23).

7 Claims, 2 Drawing Sheets

POWER SUPPLY FOR RADIO-FREQUENCY EXCITED GAS LASER

BACKGROUND OF THE INVENTION

Radio-frequency excited gas lasers are common particularly for relatively low power lasers. Excitation is provided by a radio-frequency electric field produced in the laser active medium which produces population inversions within the gas. Usually the field is produced by electrodes excited by a radio-frequency power supply. The power supplied to the laser is sufficient to cause the initial breakdown of the gas and is usually maintained at that level throughout the operation of the laser.

It has become apparent that a radio-frequency excited gas laser operates at maximum efficiency when the input power is less than the power which produces striking and/or maximum output. It is thus more economical to operate such a laser at its maximum efficiency point, particularly as the laser may readily be made to produce a desired power output when so operating. However, existing power supply circuitry does not make it possible to operate at the maximum efficiency point.

SUMMARY OF THE INVENTION

It is an object of the present invention to provide a power supply for a radio-frequency excited gas laser which enables the gas discharge to be initiated and then operates the laser at maximum efficiency.

According to the present invention there is provided a power supply for a radio-frequency excited gas laser, which includes a signal generator operable to generate a radio-frequency signal, amplifier means operable to amplify said signal and to apply to the laser sufficient power to initiate a discharge in the laser gaseous active medium, and power control means operable after initiation of the gas discharge to adjust the power supplied to that necessary to operate the laser at maximum efficiency.

BRIEF DESCRIPTION OF THE DRAWINGS

The invention will now be described with reference to the accompanying drawings, in which.

DESCRIPTION OF THE PREFERRED EMBODIMENTS

Figure 1:
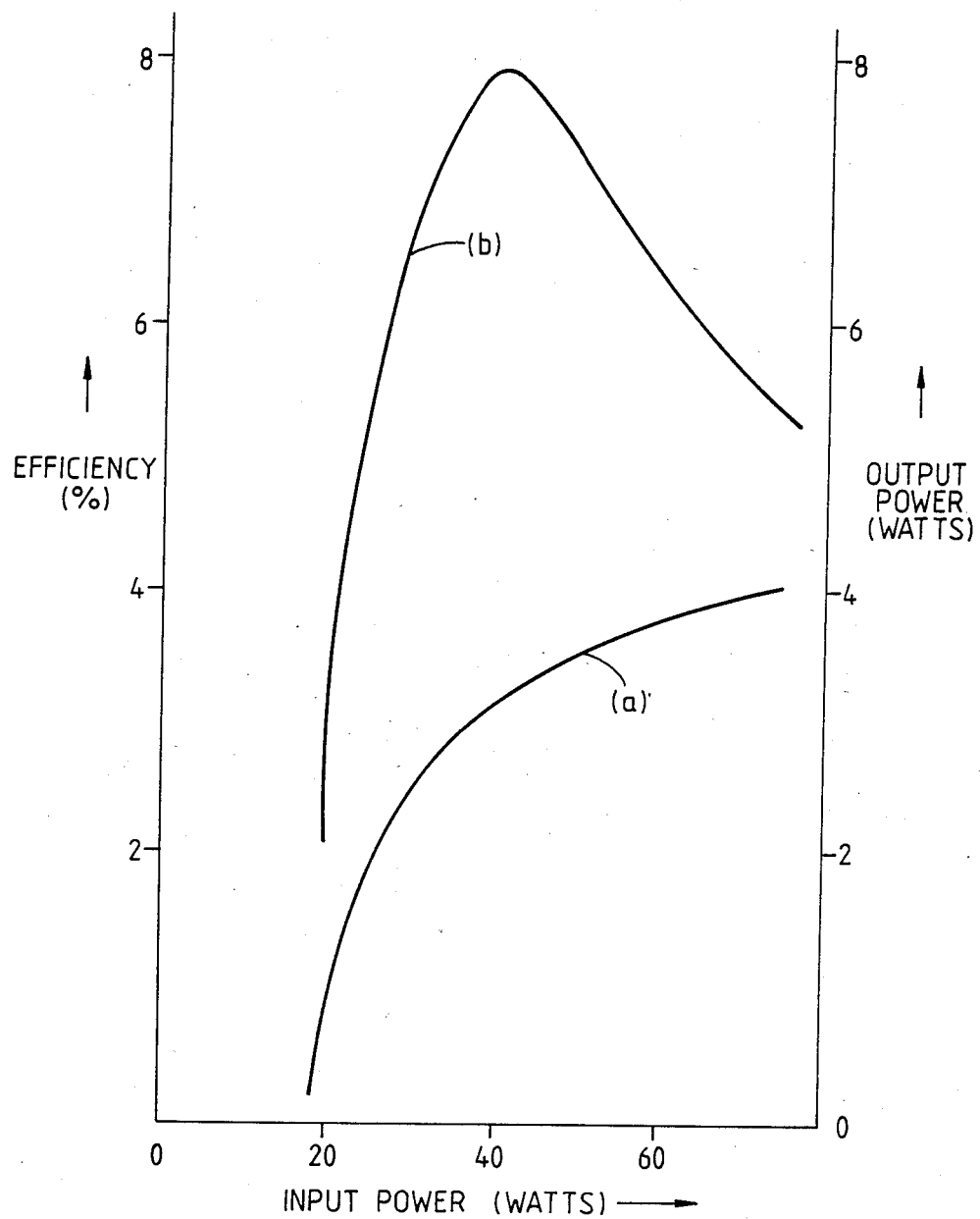
FIG. 1 illustrates the power and efficiency characteristics of a typical radio-frequency excited low power gas laser.

Referring now to FIG. 1, this shows the power and efficiency curves for a typical laser. It will be seen from curve (a) that whilst the power output increases as the input power is increased, the rate of increase falls off. As shown by the efficiency curve, curve (b), the maximum efficiency of this particular laser occurs at an input power of about 40 watts, whilst maximum power output occurs at an input power of about 70 watts. It is clearly more economical to operate a laser at its maximum efficiency, so long as this produces sufficient output power, and the power supply of the invention is intended to provide this.

Figure 2:
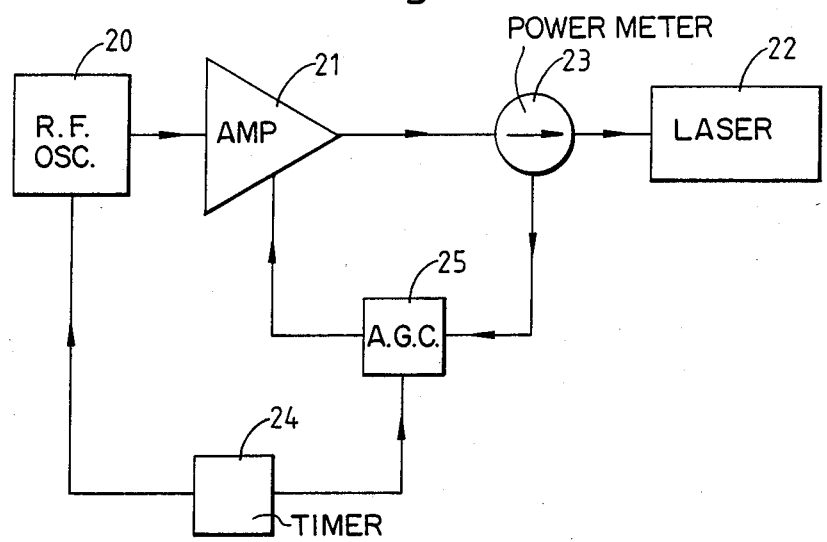
FIG. 2 is a schematic diagram illustrating a first embodiment of the invention.

FIG. 2 illustrates one power supply arrangement which satisfies this requirement. A radio-frequency oscillator 20 produces a radio-frequency output signal which is applied to an amplifier 21. This amplifier is capable of supplying sufficient power to the laser 22 to initiate a discharge in the laser gas. The power actually applied to the laser 22 is measured by a power meter 23. In this particular embodiment the signal generated by oscillator 20 has two possible levels. The highest level is that which is amplified by amplifier 21 to supply maximum power to the laser 22, whilst the lower level is that which is amplified to operate the laser at maximum efficiency. In this embodiment it is assumed that initiation of the discharge in the laser gas will take place after the power has been applied to the laser for a predetermined time. A timing circuit 24 is therefore provided which measures the time after the initial application of power to the laser and reduces the oscillator output after that time.

The power required to operate the laser at maximum efficiency will be known. Hence an automatic gain control circuit 25 may use the output of the power meter 23 to control the gain of amplifier 21 to provide the required power. Such an arrangement will also compensate for changes in supply voltage which may cause the power delivered by amplifier 21 to vary. The timing circuit 24 is arranged to inhibit the operation of the automatic gain control circuit 25 until the gas discharge has been initiated.

Figure 3:
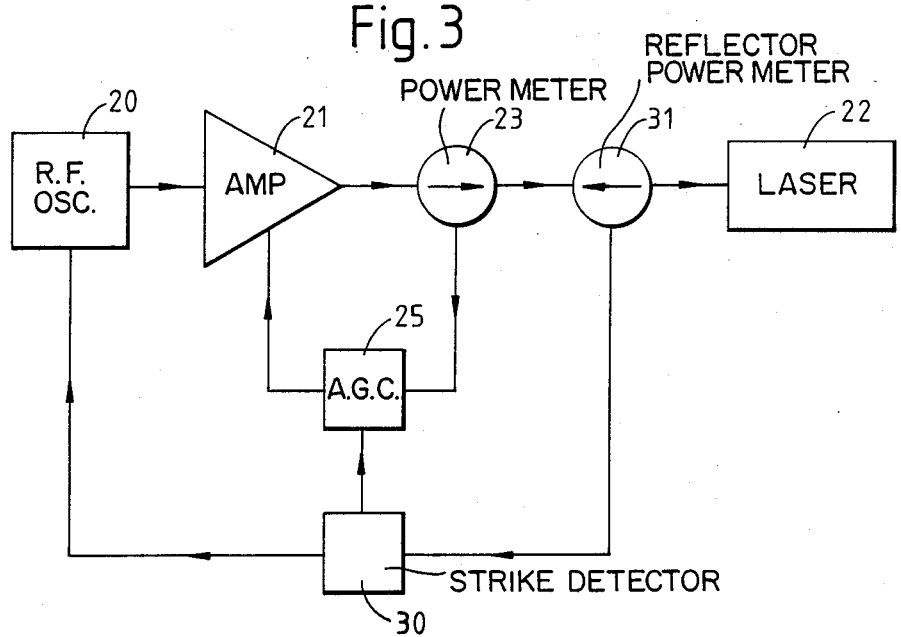
FIG. 3 is a schematic diagram illustrating a second embodiment of the invention.

The embodiment described above works on the assumption that the gas discharge in the laser will strike within a known time after first applying power to the laser. It is, of course, always possible that this will not happen. The arrangement of FIG. 3 allows for this possibility. The timing circuit of FIG. 2 is replaced by a strike detector 30 which uses the output from a reflected power meter 31. When the gas discharge in the laser is present then the laser is matched to the power supply and there is no, or little, reflected power measured by the meter 31. However, when there is no discharge there is a mismatch and a considerable proportion of the applied power will be reflected back. Hence the presence of an output from the reflected power meter 31 indicates that the discharge has not struck. Thus the strike detector ensures that maximum power is applied to the laser until the discharge has been initiated, regardless of the time that this takes. As before, the oscillator output is reduced once the discharge has struck, and the automatic gain control is allowed to function, as in the previous embodiment.

It is not necessary in either embodiment to vary the output of the oscillator, as full control of the power reduction on initiation of the discharge may be effected by the amplifier 21.

The power output and efficiency of radio-frequency excited gas lasers vary with temperature. The automatic gain control circuit 25 may therefore be provided with an input from a temperature sensor to allow for temperature changes.

The power supplies described above are particularly suitable for gas lasers using helium-neon or carbon dioxide-nitrogen-helium gas mixtures.

I claim:

1. A power supply for a radio-frequency excited laser of the type in which an electric discharge is produced in a gaseous lasing medium, which power supply includes a signal generator operable to generate a radio-frequency signal, amplifier means connected to receive and to amplify said signal and to apply to the laser sufficient electrical power to initiate a gas discharge in the gaseous lasing medium, means for measuring the power applied to said laser and power control means operable initially to apply to the laser power at a first, higher value and subsequently to reduce the power to a second, lower level and responsive to the output of the measuring means for adjusting the power supplied to the gas discharge after the initiation of the gas discharge in said medium to that value of power required to cause the laser to operate at maximum efficiency.

2. A power supply as claimed in claim 1 in which the power control means includes a timing circuit operable to reduce the power supplied to the laser after maximum power has been applied for a predetermined time interval.

3. A power supply as claimed in claim 1 in which the power control means includes strike detection means for detecting the initiation of the discharge and responsive thereto to reduce the power supplied to the laser.

4. A power supply as claimed in claim 1 in which means for adjusting the power supplied to the gas discharge includes means for reducing the output of the radio-frequency signal generator.

5. A power supply as claimed in claim 1 includes a power meter operable to measure the power applied to the laser and said power control means includes an automatic gain control circuit means connected to receive the output of the power meter operable after the initiation of the discharge for maintaining the power applied to the laser at the value required to operate the laser at maximum efficiency.

6. A power supply as claimed in claim 3 in which the strike detection means includes means for measuring power reflected from the laser.

7. A power supply as claimed in claim 5 further including means for preventing the operation of the automatic gain control until the discharge has been initiated.

* * * * *